US011173436B2

(12) United States Patent
Bonilla

(10) Patent No.: US 11,173,436 B2
(45) Date of Patent: Nov. 16, 2021

(54) CONNECTOR ASSEMBLY, FILTER ASSEMBLY, FILTER DEVICE, AND METHOD OF USE

(71) Applicant: Pall Corporation, Port Washington, NY (US)

(72) Inventor: Robb D. Bonilla, Auburn, NY (US)

(73) Assignee: Pall Corporation, Port Washington, NY (US)

( * ) Notice: Subject to any disclaimer, the term of this patent is extended or adjusted under 35 U.S.C. 154(b) by 143 days.

(21) Appl. No.: 16/795,996

(22) Filed: Feb. 20, 2020

(65) Prior Publication Data

US 2021/0260511 A1 Aug. 26, 2021

(51) Int. Cl.
*B01D 35/30* (2006.01)
*B01D 29/00* (2006.01)

(52) U.S. Cl.
CPC ....... *B01D 35/301* (2013.01); *B01D 29/0047* (2013.01); *B01D 2201/12* (2013.01); *B01D 2201/304* (2013.01); *B01D 2201/4007* (2013.01); *B01D 2201/4084* (2013.01)

(58) Field of Classification Search
CPC .............. B01D 35/301; B01D 29/0047; B01D 2201/12; B01D 2201/304; B01D 2201/4007; B01D 2201/4084; B01D 29/54; B01D 29/21; B01D 2201/291; B01D 2201/4038; B01D 35/30; B01D 2201/29; B01D 2201/30; B01D 2201/40; B01D 29/50; B01D 29/52; B01D 27/14; B01D 27/144; B01D 29/0054; B01D 35/14
USPC ....... 210/236, 232, 253, 261, 262, 314, 316, 210/322, 330, 338, 339, 446, 488, 493.2, 210/450
See application file for complete search history.

(56) References Cited

U.S. PATENT DOCUMENTS

| 5,141,637 A | * | 8/1992 | Reed ...................... B01D 29/15 210/232 |
| 5,394,316 A | | 2/1995 | Holbrook et al. |
| 7,237,682 B2 | | 7/2007 | Reynolds et al. |

(Continued)

FOREIGN PATENT DOCUMENTS

EP          2 789 375 A1    10/2014

OTHER PUBLICATIONS

European Search Report issued in Counterpart European Application 21157776.2, dated May 27, 2021.

*Primary Examiner* — Madeline Gonzalez
(74) *Attorney, Agent, or Firm* — Leydig, Voit & Mayer, Ltd.

(57) ABSTRACT

A connector assembly for fluid filter elements is provided comprising first and second connector elements each comprising at least two connector snap arches, each of the connector snap arches including a snap tooth lock; and at least two connector snap arms, each of the connector snap arms including a snap tooth; each connector element having a central opening, and an annular channel for receiving an end of a hollow cylindrical filter element; a gasket arranged between the first connector element and the second connector element, the gasket having a central opening; wherein the first connector element and the second connector element are lockably engageable with each other when placed in contact with each other and axial force is applied such that respective connector snap tooth is retained in each respective connector snap tooth.

8 Claims, 10 Drawing Sheets

(56) References Cited

U.S. PATENT DOCUMENTS

| | | |
|---|---|---|
| 2006/0186031 A1 | 8/2006 | Fick et al. |
| 2011/0042294 A1 | 2/2011 | Bonta et al. |
| 2020/0179840 A1 | 6/2020 | Vichev et al. |
| 2021/0260506 A1 | 8/2021 | Bonilla |

* cited by examiner

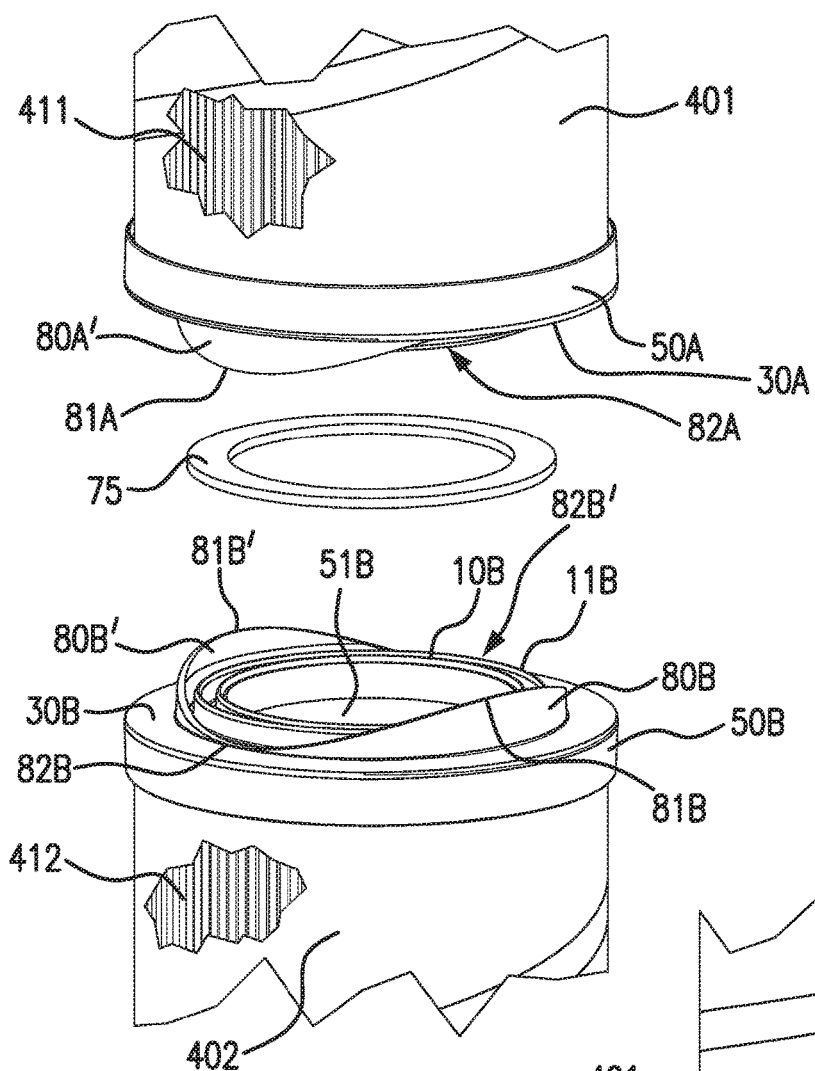
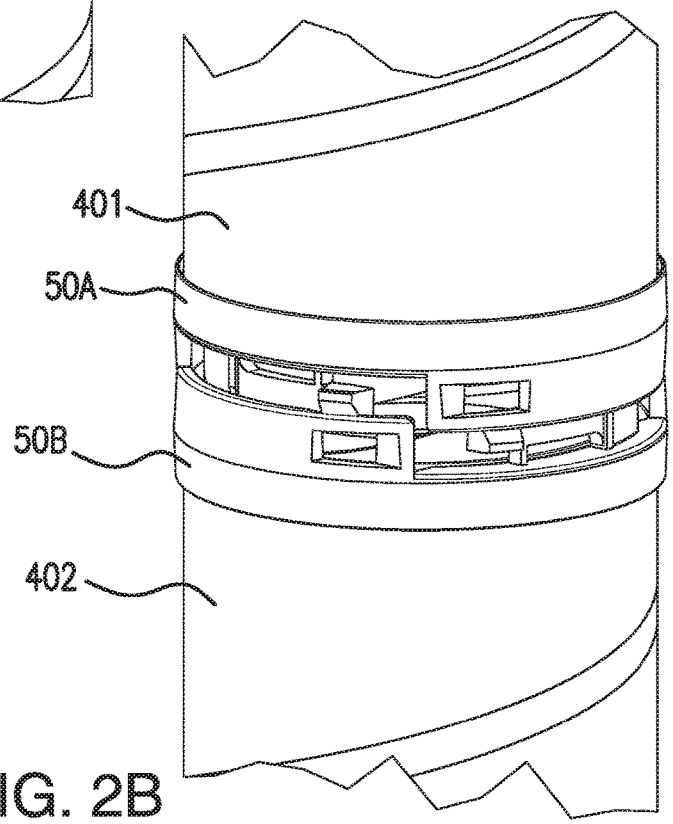
FIG. 2A
FIG. 2B

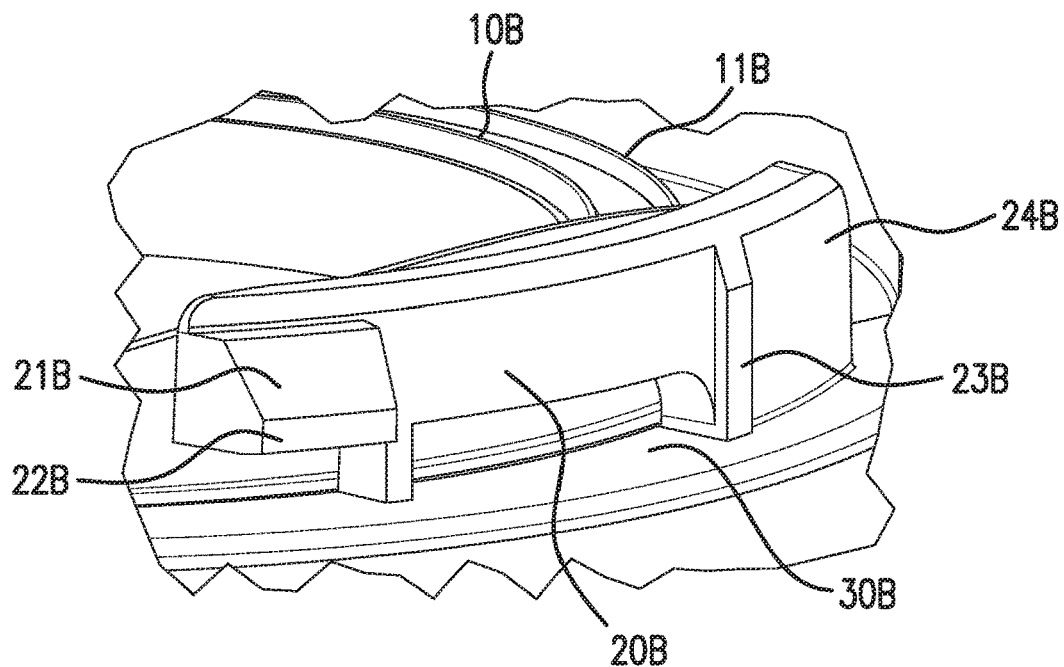
FIG. 4
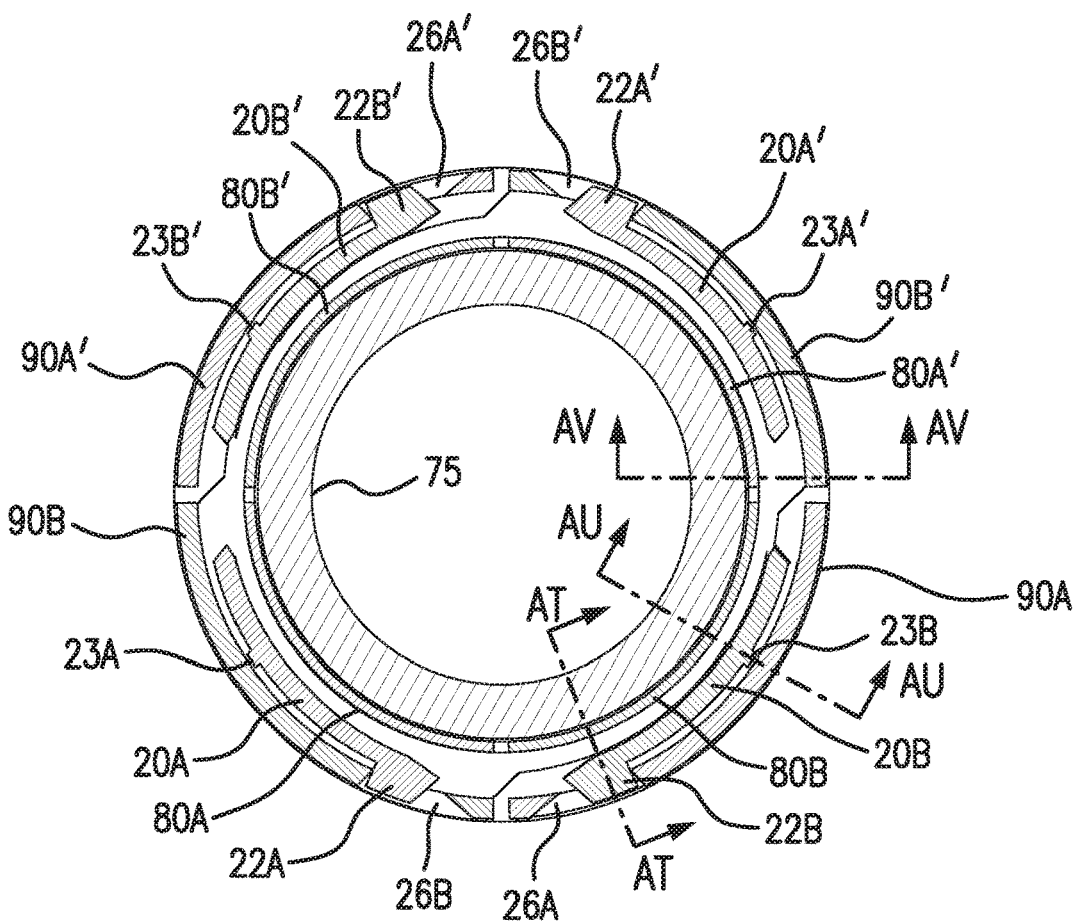
SECTION AE-AE  FIG. 5

CONNECTOR ASSEMBLY, FILTER ASSEMBLY, FILTER DEVICE, AND METHOD OF USE

BACKGROUND OF THE INVENTION

Filter assembly tooling may limit the length of produced filter elements. As a result, if increased filter element length is desired, e.g., to increase the available effective filtration area, two filter elements are produced having the desired length, and are bonded to a single piece (common) joining element.

The present invention provides for ameliorating at least some of the disadvantages of the prior art. These and other advantages of the present invention will be apparent from the description as set forth below.

BRIEF SUMMARY OF THE INVENTION

An embodiment of the invention provides a connector assembly for first and second fluid filter elements comprising: (a) a first connector element comprising at least two first connector snap arches, each of the at least two first connector snap arches including a snap tooth lock; and at least two first connector snap arms, each of the at least two first connector snap arms including a snap tooth; the first connector element having a central opening, and an annular channel for receiving an end of a first hollow cylindrical filter element; (b) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel for receiving an end of a second hollow cylindrical filter element; and, (c) a gasket arranged between the first connector element and the second connector element, the gasket having a central opening; wherein the first connector element and the second connector element are lockably engageable with each other when placed in contact with each other and an axial force is applied such that each first connector snap tooth is retained in each respective second connector snap tooth lock, and each second connector snap tooth is retained in each respective first connector snap tooth lock.

In another embodiment, a filter assembly comprises (a) a first hollow cylindrical filter element, having a first end and a second end; (b) a first connector element comprising at least two first connector snap arches, each of the at least two first connector snap arches including a snap tooth lock; and at least two first connector snap arms, each of the at least two first connector snap arms including a snap tooth; the first connector element having a central opening, and an annular channel having the first end of the first hollow cylindrical filter element bonded therein; (c) a second hollow cylindrical filter element, having a first end and a second end; (d) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel having the first end of the second hollow cylindrical filter element bonded therein; and, (e) a gasket arranged between the first connector element and the second connector element, the gasket having a central opening; wherein the first connector element and the second connector element are lockably engaged with each other such that each first connector snap tooth is retained in each respective second connector snap tooth lock, and each second connector snap tooth is retained in each respective first connector snap tooth lock.

In another embodiment, a filter sub-assembly is provided comprising: (a) a hollow cylindrical filter element, having a first end and a second end; and, (b) a connector element comprising at least two first connector snap arches, each of the at least two connector snap arches including a snap tooth lock; and at least two connector snap arms, each of the at least two connector snap arms including a snap tooth; the connector element having a central opening, and an annular channel having the first end of the hollow cylindrical filter element bonded therein.

A method of connecting filter sub-assemblies according to another embodiment of the invention comprises axially aligning a first filter assembly comprising: (a) a first hollow cylindrical filter element, having a first end and a second end; (b) a first connector element comprising at least two first connector snap arches, each of the at least two first connector snap arches including a snap tooth lock; and at least two first connector snap arms, each of the at least two first connector snap arms including a snap tooth; the first connector element having a central opening, and an annular channel having the first end of the first hollow cylindrical filter element bonded therein; with a second filter assembly comprising: (c) a second hollow cylindrical filter element, having a first end and a second end; (d) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel having the first end of the second hollow cylindrical filter element bonded therein; including arranging a gasket having a central opening between the first connector element and the second connector element; and, applying an axial force to the first filter sub-assembly or the second filter sub-assembly such that each first connector snap tooth is retained in each respective second connector snap tooth lock, and each second connector snap tooth is retained in each respective first connector snap tooth lock.

BRIEF DESCRIPTION OF THE SEVERAL VIEWS OF THE DRAWING(S)

FIG. 1A shows an assembled filter assembly according to an embodiment of the invention, including first and second filter elements, bonded to respective first and second connector elements (thus providing filter sub-assemblies), wherein the first and second connector elements are joined together, and each connector element includes a snap arch including a snap tooth lock, and a snap arm including a snap tooth. FIG. 1B shows a partial view of an unassembled filter assembly, showing the filter elements bonded to the connector elements, before the connector elements are joined together, also showing one connector element includes two walls each having a hyperbolic paraboloid shape.

FIG. 2A shows a view similar to that shown in FIG. 1B, showing the connector elements including walls having hyperbolic paraboloid shapes without showing the snap arches and snap arms shown in FIG. 1B. FIG. 2B shows the connector elements aligned before they will be connected by axial force. FIG. 2C shows alignment between the walls of each connector element having hyperbolic paraboloid shapes, such that the uppermost part of one wall of one connector element aligns with the lowermost part of the corresponding wall of the other connector element.

FIG. 4 is a partial exploded perspective view of a part of the connector element, showing a snap arm including a snap tooth having a snap ramp and a snap nose, and a centering rib.

FIG. 5 is a cross-sectional plan view of the assembled filter device, taken along line AE-AE of FIG. 1A.

DETAILED DESCRIPTION OF THE INVENTION

Figure 1A:
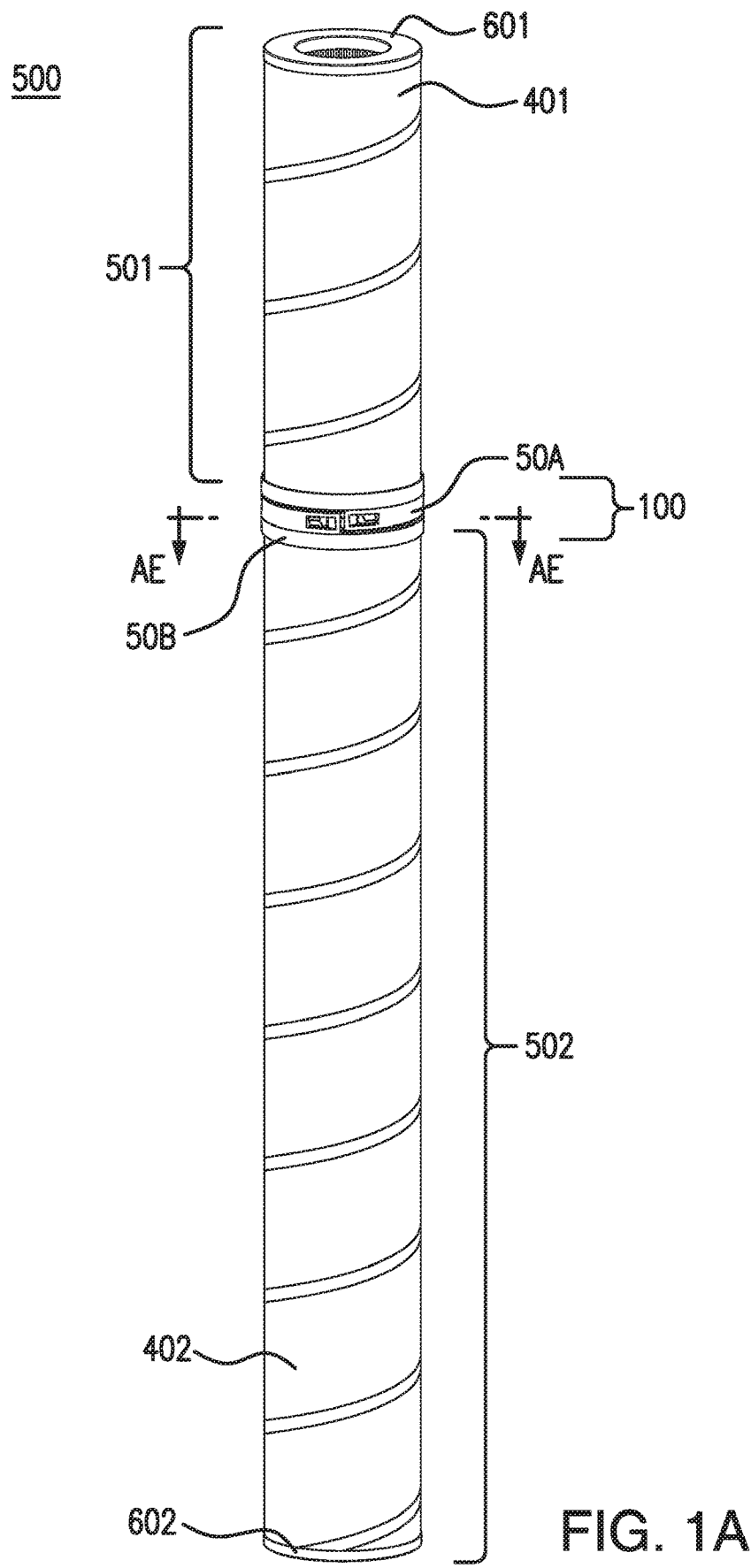

In accordance with an embodiment of the invention, a connector assembly for first and second fluid filter elements comprises: (a) a first connector element comprising at least two first connector snap arches, each of the at least two first connector snap arches including a snap tooth lock; and at least two first connector snap arms, each of the at least two first connector snap arms including a snap tooth; the first connector element having a central opening, and an annular channel for receiving an end of a first hollow cylindrical filter element; (b) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel for receiving an end of a second hollow cylindrical filter element; and, (c) a gasket arranged between the first connector element and the second connector element, the gasket having a central opening; wherein the first connector element and the second connector element are lockably engageable with each other when placed in contact with each other and an axial force is applied such that each first connector snap tooth is retained in each respective second connector snap tooth lock, and each second connector snap tooth is retained in each respective first connector snap tooth lock.

In a typical embodiment, each snap tooth includes a snap ramp.

In a preferred embodiment, each connector element includes two walls, each wall having a hyperbolic paraboloid shape.

In another embodiment, a filter assembly comprises (a) a first hollow cylindrical filter element, having a first end and a second end; (b) a first connector element comprising at least two first connector snap arches, each of the at least two first connector snap arches including a snap tooth lock; and at least two first connector snap arms, each of the at least two first connector snap arms including a snap tooth; the first connector element having a central opening, and an annular channel having the first end of the first hollow cylindrical filter element bonded therein; (c) a second hollow cylindrical filter element, having a first end and a second end; (d) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel having the first end of the second hollow cylindrical filter element bonded therein; and, (e) a gasket arranged between the first connector element and the second connector element, the gasket having a central opening; wherein the first connector element and the second connector element are lockably engaged with each other such that each first connector snap tooth is retained in each respective second connector snap tooth lock, and each second connector snap tooth is retained in each respective first connector snap tooth lock.

In another embodiment, a filter sub-assembly is provided comprising: (a) a hollow cylindrical filter element, having a first end and a second end; and, (b) a connector element comprising at least two first connector snap arches, each of the at least two connector snap arches including a snap tooth lock; and at least two connector snap arms, each of the at least two connector snap arms including a snap tooth; the connector element having a central opening, and an annular channel having the first end of the hollow cylindrical filter element bonded therein.

A method of connecting filter sub-assemblies according to another embodiment of the invention comprises axially aligning a first filter assembly comprising: (a) a first hollow cylindrical filter element, having a first end and a second end; (b) a first connector element comprising at least two first connector snap arches, each of the at least two first connector snap arches including a snap tooth lock; and at least two first connector snap arms, each of the at least two first connector snap arms including a snap tooth; the first connector element having a central opening, and an annular channel having the first end of the first hollow cylindrical filter element bonded therein; with a second filter assembly comprising: (c) a second hollow cylindrical filter element, having a first end and a second end; (d) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel having the first end of the second hollow cylindrical filter element bonded therein; including arranging a gasket having a central opening between the first connector element and the second connector element; and, applying an axial force to the first filter sub-assembly or the second filter sub-assembly such that each first connector snap tooth is retained in each respective second connector snap tooth lock, and each second connector snap tooth is retained in each respective first connector snap tooth lock.

A filter device according to an embodiment of the invention comprises an embodiment of at least one filter assembly arranged in a housing having an inlet and an outlet and defining a fluid flow path between the inlet and the outlet with the filter assembly arranged across the fluid flow path. In some embodiments, the filter device includes two or more filter assemblies arranged in the housing, defining a fluid flow paths between the inlet and the outlet with each filter assembly arranged across the fluid flow path.

A method of filtration according to an embodiment of the invention comprises passing a fluid along the fluid flow path through embodiment of the filter device.

A variety of fluids can be processed using embodiment of the filter device. In one embodiment, the filter device comprises a coalescer, coalescing water and/or oil (and in some embodiments, removing particulate matter) from the stream of fluid being processed.

Advantageously, separate filter sub-assemblies having various filter element lengths can be produced in advance (manufactured independent of each other), joined and shipped, or shipped and subsequently joined (without adhesive or curing time), providing a cost-effective option for obtaining different filters for different applications.

Each of the components of the invention will now be described in more detail below, wherein like components have like reference numbers. In accordance with the embodiments of the connector elements and connector assembly shown in FIGS. 1A, 1B, 2A, 2C and 3-8, the first and second connector elements have the same corresponding elements.

Figure 1B:
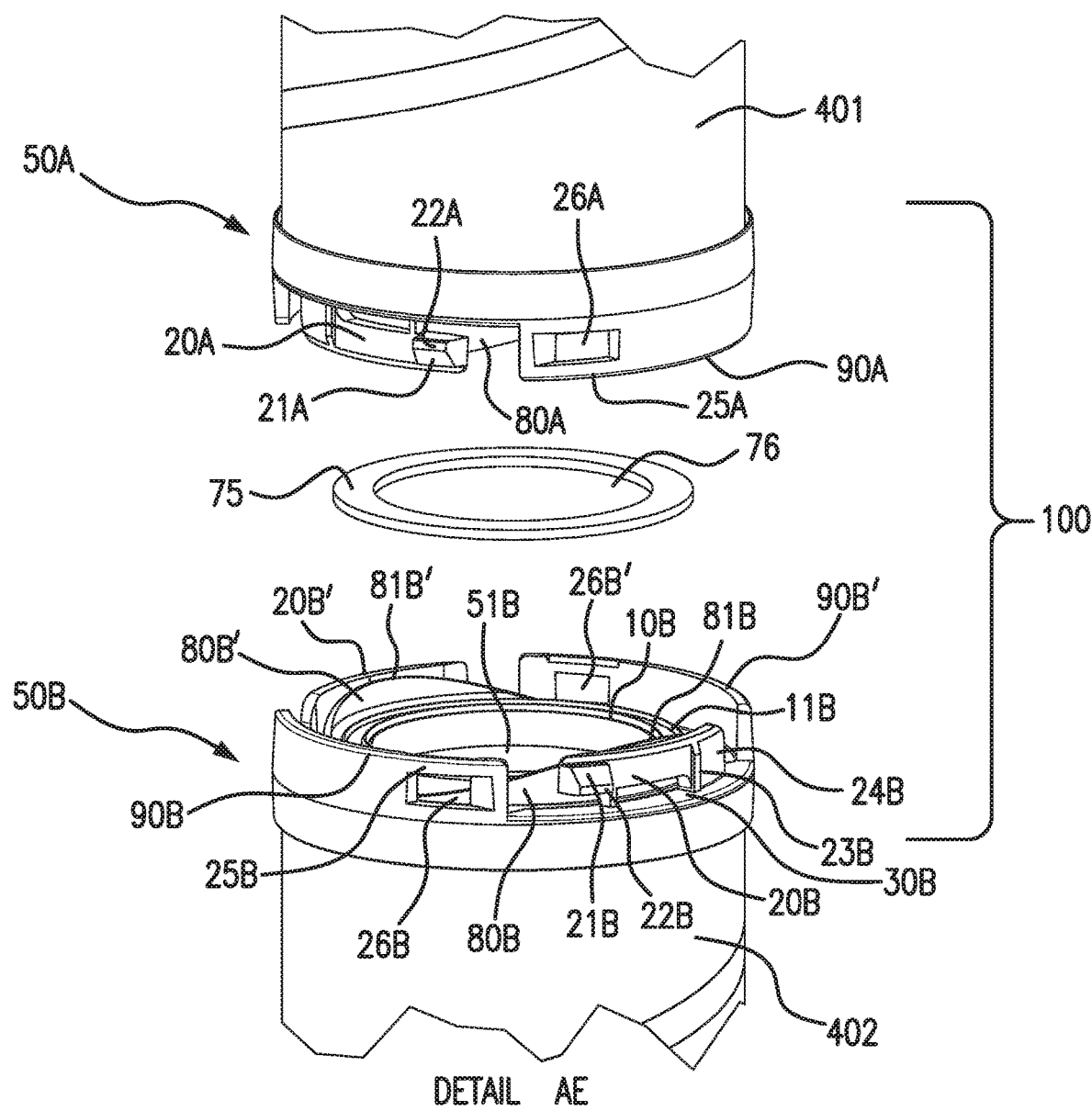

FIGS. 1A and 1B show a filter assembly 500 according to an embodiment of the invention, including a first filter element 401 having one end bonded to an embodiment of a first connector element 50A and the other end bonded to an end cap 601 (providing sub-assembly 501), and an embodiment of a second filter element 402 having one end bonded to a second connector element 50B and the other end bonded to an end cap 602 (providing sub-assembly 502), the first connector element 50A and the second connector element 50B forming an embodiment of a connector assembly 100. FIG. 1A shows an assembled filter assembly wherein the connector elements are joined together, and the partial view in FIG. 1B shows an unassembled filter device, also showing an annular gasket 75 having a central opening 76, arranged between the connector elements, wherein the second connector element 50B includes a base 30 and two walls 80B, 80B', each having a hyperbolic paraboloid shape with an uppermost part 81B, 81B', and a central opening 51B for fluid flow. While first connector element 50A also has includes a base 30A and two walls each having a hyperbolic paraboloid shape, and a central opening for fluid flow, only wall 80A is shown in FIG. 1B (see also, FIGS. 2A and 5).

While FIG. 1A shows first filter element 401 having a greater total length than second filter element 402, the invention is not so limited, either filter element can have a longer total length than the other, or they can have the same total lengths, and a filter device can have more than 2 filter elements. Moreover, while FIG. 1A shows end caps 601, 602, either or both end caps can be replaced with connector elements, e.g., to allow connection with additional filter elements.

Figure 2C:
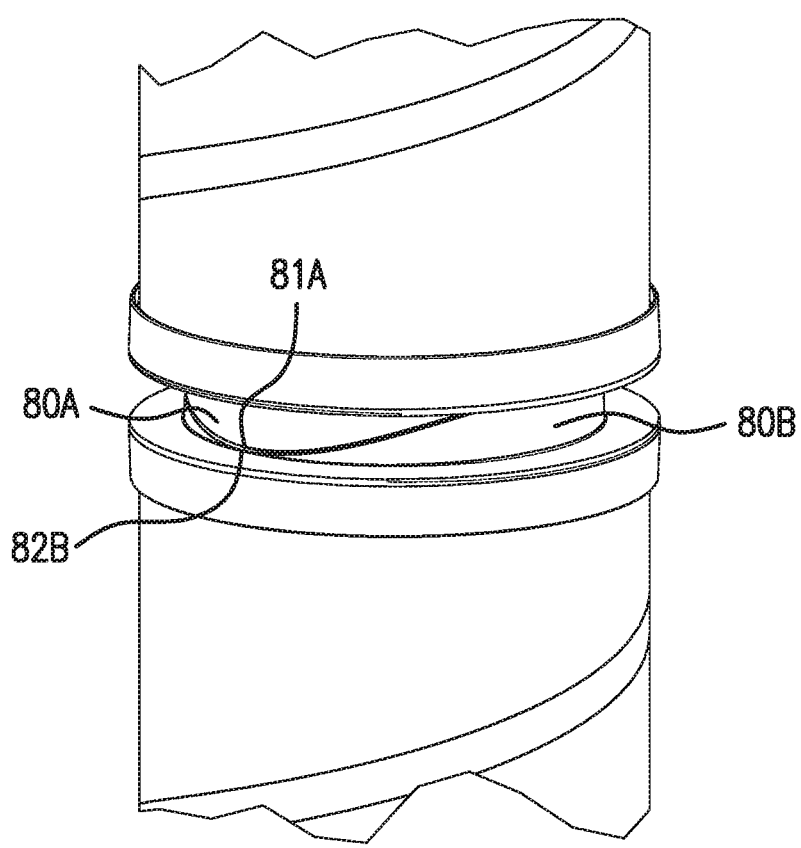

The cylindrical walls 80A, 80A', 80B, 80B', projecting upwardly from base 30A, 30B, each have a hyperbolic paraboloid shape, and have uniform acclivity, with uppermost parts 81A, 81A', 81B, 81B' of the walls, and lowermost portions 82A, 82A', 82B, 82B' between the walls (see, for example, FIG. 2A, 82A' not shown due to angle of view), and as shown in FIG. 2C, the uppermost parts of the walls of one connector element align with the lowermost portions between the walls of the other connector when the connector elements are joined.

FIG. 1B also shows each connector element 50A, 50B including, projecting upwardly from the base, a respective concentrically arranged crown 90A, 90B, including a snap tooth lock 26A, 26B, extending in a circumferential direction forming a snap arch 25A, 25B, wherein the connector elements each also include a snap arm 20A, 20B, including a snap tooth 22A, 22B, having a snap ramp 21A, 21B. In this illustrated embodiment (also shown in FIG. 4), second connector element 50B includes a centering rib 23B and a snap root 24B. The presence of centering ribs, that are present between the outside of a snap arm and the inside of a crown, can be desirable in reducing or preventing radial sliding, e.g., coaxial dislocation of the two connector elements once connected or assembled. Preferably, each connector element has at least two crowns each including a snap arches, and at least two snap arms as described with respect to FIG. 1B (see, for example, FIG. 5). In the embodiment illustrated in FIG. 5, each connector element has crowns and snap teeth locks; snap arms and snap teeth/snap ramps; centering ribs and snap roots, equally spaced from one another in a circumferential direction.

When the first and second elements are brought together, positioned coaxially with the respect snap teeth aligned with the snap teeth locks, and with the gasket placed coaxially between the elements, axial force is applied and the respective snap arches are engaged and the snap arms are slightly flexed inwardly and the snap arches are slightly deflected outwardly, and the snap teeth pass over the snap arches into the snap teeth locks. This action occurs simultaneously circumferentially with all of the snap arches and snap arms. The outermost diameter of all of the snap teeth should be congruent with the outermost surface of the snap teeth locks to maintain a fluid-tight seal.

The snap ramps pass over the snap arches and secure the snap teeth into the snap teeth locks, and spring back to their original configuration such that the snap arches retain the trailing edges of the snap teeth and prevent reverse axial action out of the snap teeth locks. As a result, the snap connector elements cannot be disengaged without damaging the elements, unless a special tool is used.

In some embodiments, the connector assembly is used with filter elements such that no leak is observed at 5 inches of water column (0.18 psi).

FIGS. 1B, 2A, and 4 also show, projecting upwardly from the base, concentrically arranged circular inner sealing wall 10B and outer sealing wall 11B of second connector element 50B. As shown in more detail in, for example, FIGS. 6-8 (also showing the corresponding sealing walls 10A and 11B of first connector element 50A), the angular peaks or tips of the sealing walls compress the upper and lower planar surfaces of the gasket 75 when the connector elements are joined, providing a seal.

Figure 6:
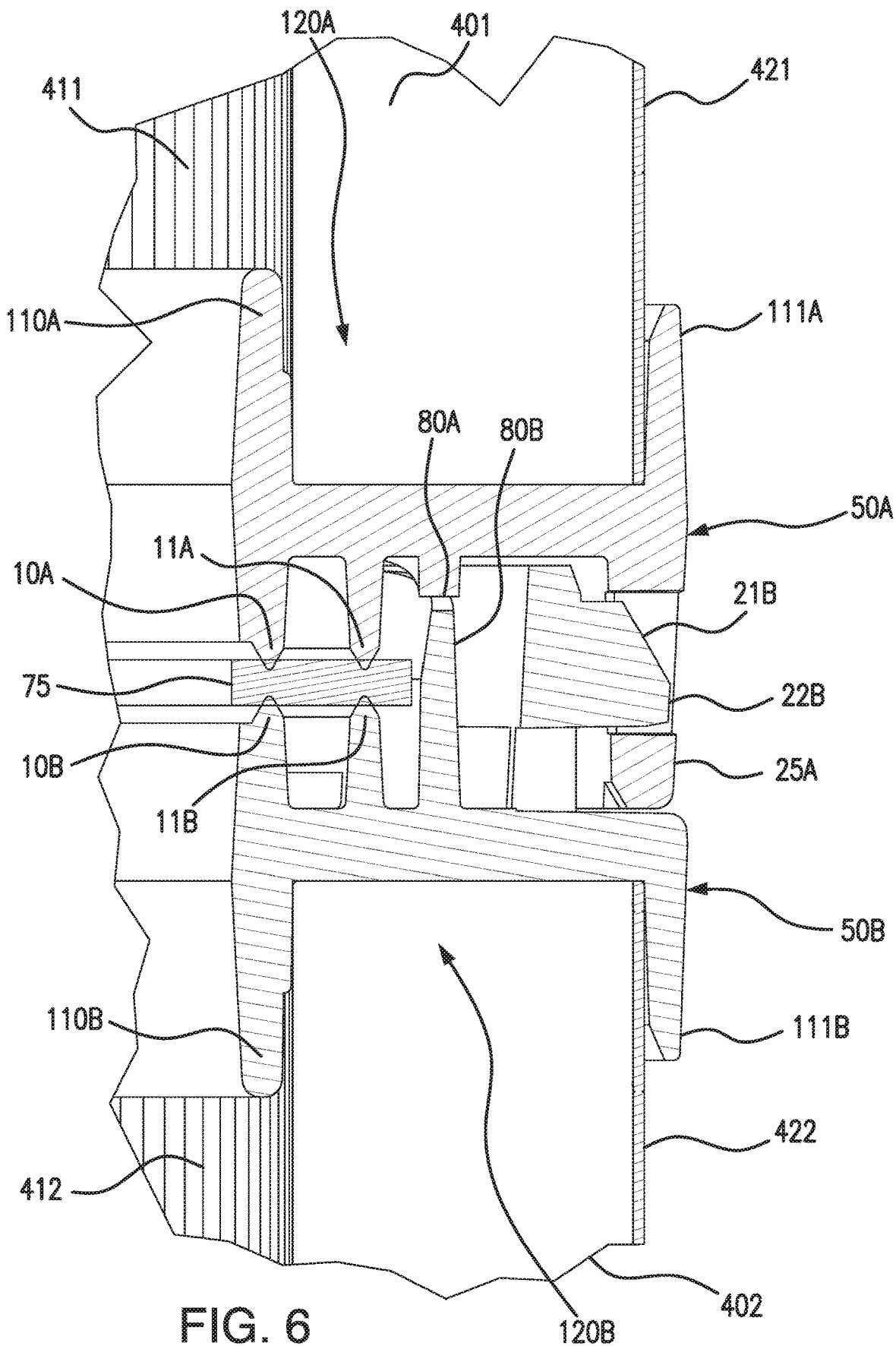
FIG. 6 is a fragmented cross-sectional view taken along line AT-AT of FIG. 5.
Figure 7:
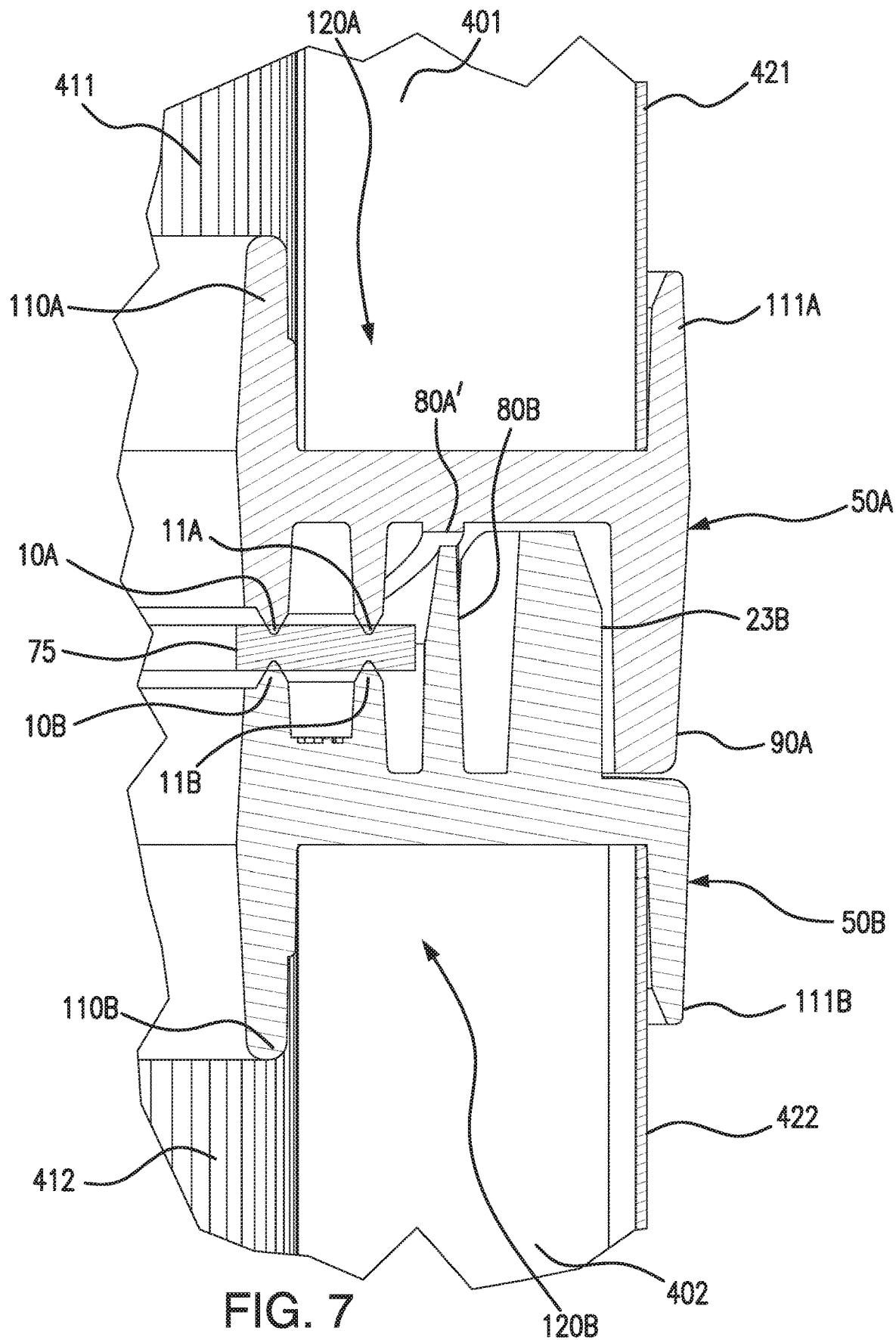
FIG. 7 is a fragmented cross-sectional view taken along line AU-AU of FIG. 5.
Figure 8:
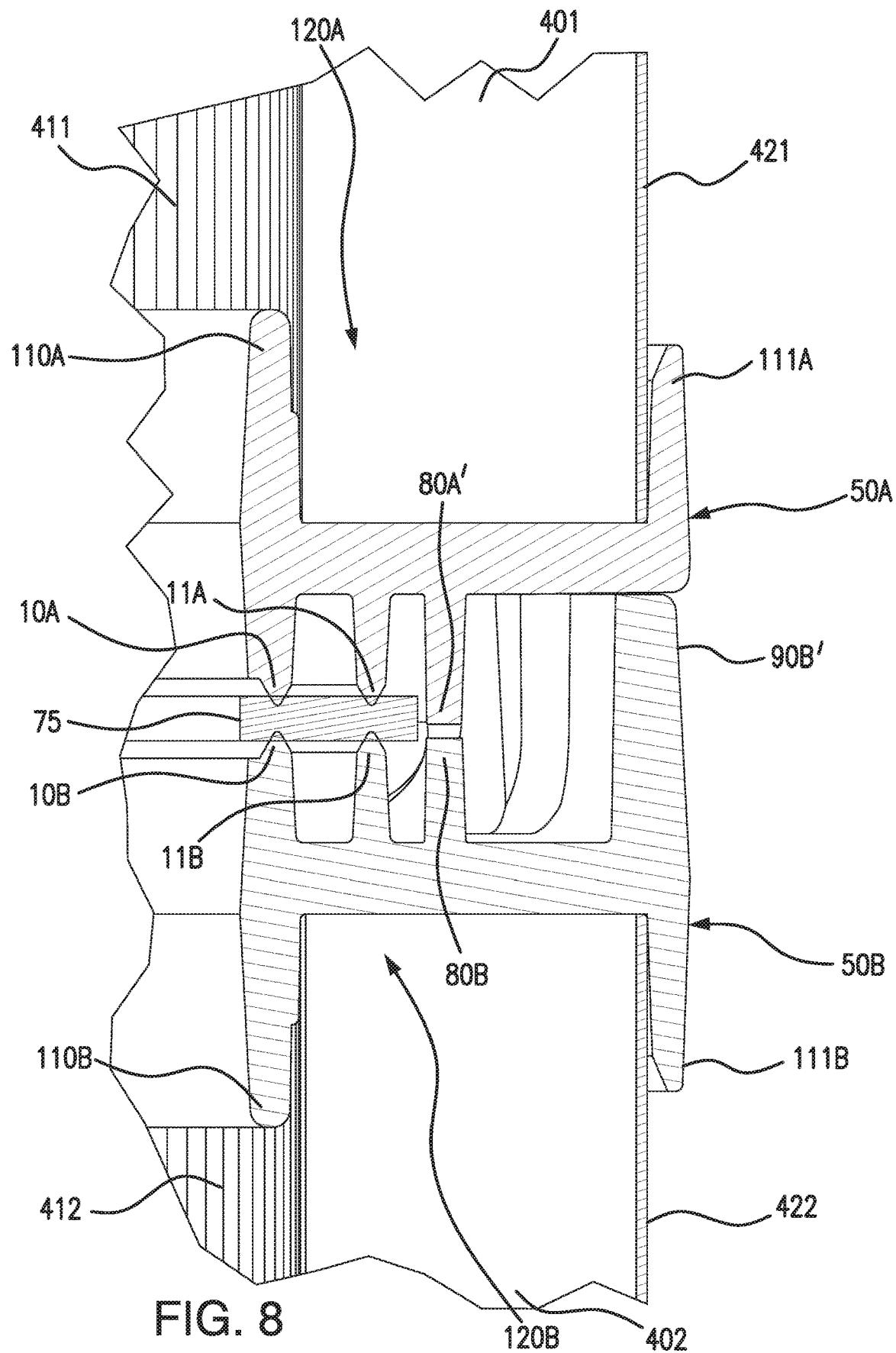
FIG. 8 is a fragmented cross-sectional view taken along line AV-AV of FIG. 5.

As shown in FIGS. 6-8, each connector element includes an annular channel (typically generally U-shaped) 120A, 120B formed by concentrically arranged circular inner walls 110A, 110B and outer walls 111A, 111B, defining a space for receiving ends of the filter elements. While the filter elements are illustrated with outer cages 421, 422 contacting the outer walls 111A, 111B, the cages are optional. The ends of the filter elements in the channels are preferably bound therein, e.g., by adhesive or other bonding reagents and/or techniques known in the art.

Figure 3:
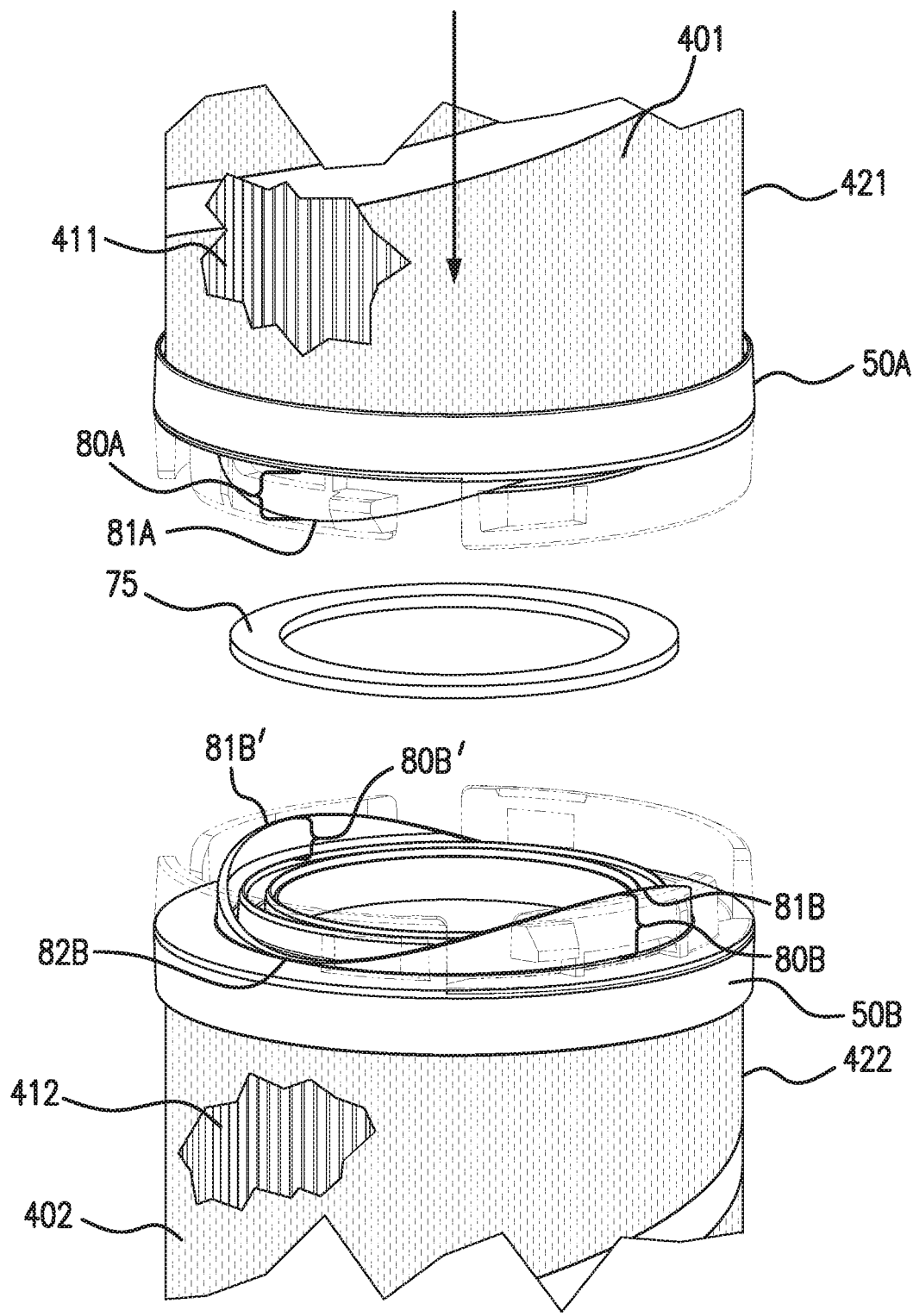
FIG. 3 shows a fragmented exploded perspective view similar to that shown in FIGS. 1B and 2A, wherein the walls having hyperbolic paraboloid shapes are included, also including a snap tooth lock, a snap arch including a snap tooth, and a snap arm in phantom. The arrow shows the direction that applied axial force will connect the connector elements.

A variety of filter elements can be used in accordance with the invention, and are known in the art. In accordance with embodiments of the invention, the filter elements can have a hollow cylindrical configuration, in some embodiments, a pleated hollow cylindrical configuration. FIGS. 2A and 3 show pleated hollow cylindrical filter elements 401, 402, including pleats 411, 412.

A filter can include additional elements, layers, or components, that can have different structures and/or functions, e.g., at least one of any one or more of the following: prefiltration, support, drainage, spacing and cushioning. Illustratively, the filter can also include at least one additional element such as a mesh and/or a screen. FIGS. 3 and 6-8 show filter elements with an outer screen 421, 422.

A variety of end caps 601, 602, including open and closed end caps, are known in the art. If desired, either or both end caps can be replaced with connector elements, e.g., to allow connection with additional filter elements.

Figure 9:
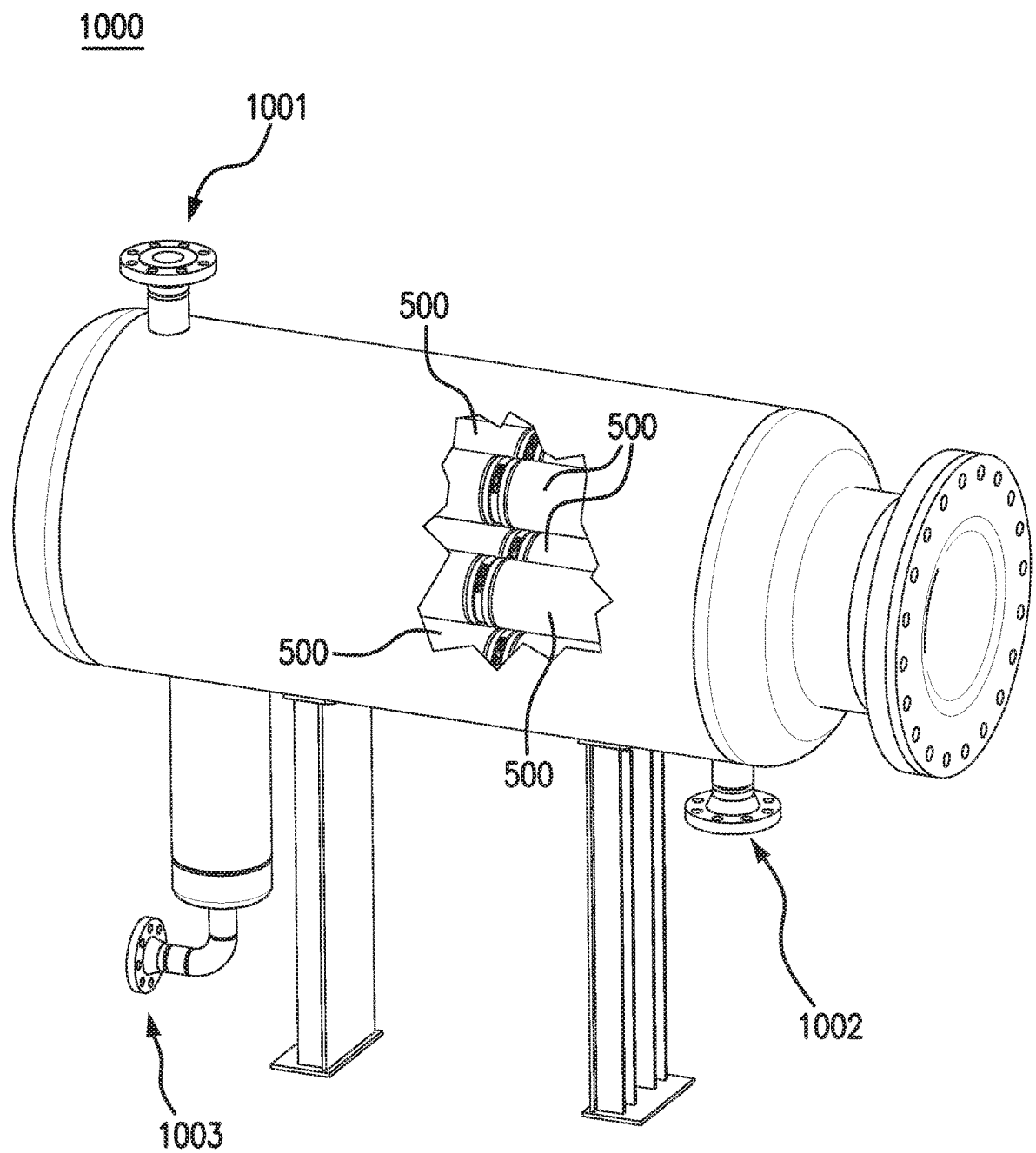
FIG. 9 is a partial cut-away perspective view of a filter device including a plurality of filter assemblies as shown in in FIG. 1A.

The filter assembly comprising a plurality of filter elements is typically disposed in a filter housing comprising at least one inlet and at least one outlet and defining at least one fluid flow path between the inlet and the outlet, wherein the filter assembly is across the fluid flow path, to provide a filter device. Embodiments of the filter device can include a plurality of filter assemblies disposed in a filter housing comprising at least one inlet and at least one outlet and defining at least one fluid flow path between the inlet and the outlet, wherein each filter assembly is across the fluid flow path. For example, the embodiment of a filter device 1000 illustrated in FIG. 9 has 5 filter assemblies 500 arranged between the inlet 1001 and filtrate outlet 1002 of the filter housing, wherein each filter assembly is across a fluid flow path. In this illustrated embodiment, the filter device is a coalescer, also comprising a coalesced fluid outlet 1003.

Preferably, the filter device is sterilizable. Any housing of suitable shape and providing at least one inlet and at least one outlet may be employed.

The connector elements can be can be fabricated from any suitable impervious material, e.g., a resilient plastic material that can temporarily deform and spring back to their original configuration, which is compatible with the fluid being processed.

The gasket is typically a pliant elastomeric material.

The filter device housing can be fabricated from any suitable rigid impervious material, including any impervious thermoplastic material, which is compatible with the fluid being processed. For example, the housing can be fabricated from a metal, such as stainless steel, or from a polymer.

EXAMPLE

This example shows that the connector elements can be joined without leaking.

First and second connector elements with an interposed gasket as generally shown in the Figures are prepared and connected such that the snap ramps pass over the snap arches and secure the snap teeth into the snap teeth locks, and spring back to their original configuration such that the snap arches retain the trailing edges of the snap teeth and prevent reverse axial action out of the snap teeth locks. Gaskets covered by top and bottom metal plates having central holes are placed on the open ends of the connector elements. The top plate has an additional opening for introducing air into the connected element through a seal plug. A tie rod with a threaded end is placed through the central hole of the top and bottom plates with seals around the tie rod at the top and bottom plates, and a nut is tightened on the threaded end to provide a sandwiched assembly, and the tie rod is torqued to 10 foot pounds.

An air hose is attached to the seal plug, which is attached to a calibrated flow meter and a supply of air. The sandwiched assembly is submerged in isopropyl alcohol, and air is slowly introduced into the interior of the sandwiched assembly, to see if bubbles pass from the sandwiched assembly, as the presence of bubbles would indicate a leak.

At 30 minutes, no leak is detected at 30 inches of water column (1.08 psi).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A connector assembly for first and second fluid filter elements comprising:
   (a) a first connector element comprising at least two first connector snap arches, each of the at least two first connector snap arches including a snap tooth lock; and at least two first connector snap arms, each of the at least two first connector snap arms including a snap tooth; the first connector element having a central opening, and an annular channel for receiving an end of a first hollow cylindrical filter element;
   (b) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel for receiving an end of a second hollow cylindrical filter element; and, (c) a gasket arranged between the first connector element and the second connector element, the gasket having a central opening;
wherein the first connector element and the second connector element are lockably engageable with each other when placed in contact with each other and an axial force is applied such that each first connector snap tooth is retained in each respective second connector snap tooth lock, and each second connector snap tooth is retained in each respective first connector snap tooth lock.

2. The connector assembly of claim 1, wherein each snap tooth includes a snap ramp.

3. The connector assembly of claim 1, wherein each connector element includes two walls, each wall having a hyperbolic paraboloid shape.

4. A filter assembly comprising:
(a) a first hollow cylindrical filter element, having a first end and a second end;
(b) a first connector element comprising at least two first connector snap arches, each of the at least two first connector snap arches including a snap tooth lock; and at least two first connector snap arms, each of the at least two first connector snap arms including a snap tooth; the first connector element having a central opening, and an annular channel having the first end of the first hollow cylindrical filter element bonded therein;
(c) a second hollow cylindrical filter element, having a first end and a second end;
(d) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel having the first end of the second hollow cylindrical filter element bonded therein; and,
(e) a gasket arranged between the first connector element and the second connector element, the gasket having a central opening;
wherein the first connector element and the second connector element are lockably engaged with each other such that each first connector snap tooth is retained in each respective second connector snap tooth lock, and each second connector snap tooth is retained in each respective first connector snap tooth lock.

5. A filter device comprising the filter assembly of claim 4 arranged in a housing having an inlet and an outlet and defining a fluid flow path between the inlet and the outlet with at least one filter assembly arranged across the fluid flow path.

6. A method of filtration, the method comprising passing a fluid along a fluid flow path through a filter device comprising
a housing having an inlet and an outlet and defining the fluid flow path between the inlet and the outlet with at least one filter assembly arranged across the fluid flow path,
the at least one filter assembly comprising:
(a) a first hollow cylindrical filter element, having a first end and a second end;
(b) a first connector element comprising at least two first connector snap arches, each of the at least two first connector snap arches including a snap tooth lock; and at least two first connector snap arms, each of the at least two first connector snap arms including a snap tooth; the first connector element having a central opening, and an annular channel having the first end of the first hollow cylindrical filter element bonded therein;
(c) a second hollow cylindrical filter element, having a first end and a second end;
(d) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel having the first end of the second hollow cylindrical filter element bonded therein; and,
(e) a gasket arranged between the first connector element and the second connector element, the gasket having a central opening;
wherein the first connector element and the second connector element are lockably engaged with each other such that each first connector snap tooth is retained in each respective second connector snap tooth lock, and each second connector snap tooth is retained in each respective first connector snap tooth lock.

7. A method of connecting filter sub-assemblies, the method comprising:
axially aligning a first filter assembly comprising:
(a) a first hollow cylindrical filter element, having a first end and a second end;
(b) a first connector element comprising at least two first connector snap arches, each of the at least two first connector snap arches including a snap tooth lock; and at least two first connector snap arms, each of the at least two first connector snap arms including a snap tooth; the first connector element having a central opening, and an annular channel having the first end of the first hollow cylindrical filter element bonded therein;
with a second filter assembly comprising:
(c) a second hollow cylindrical filter element, having a first end and a second end;
(d) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel having the first end of the second hollow cylindrical filter element bonded therein;
including arranging a gasket having a central opening between the first connector element and the second connector element; and,
applying an axial force to the first filter sub-assembly or the second filter sub-assembly such that each first connector snap tooth is retained in each respective second connector snap tooth lock, and each second connector snap tooth is retained in each respective first connector snap tooth lock.

8. The connector assembly of claim 2, wherein each connector element includes two walls, each wall having a hyperbolic paraboloid shape.

* * * * *